UNITED STATES PATENT OFFICE.

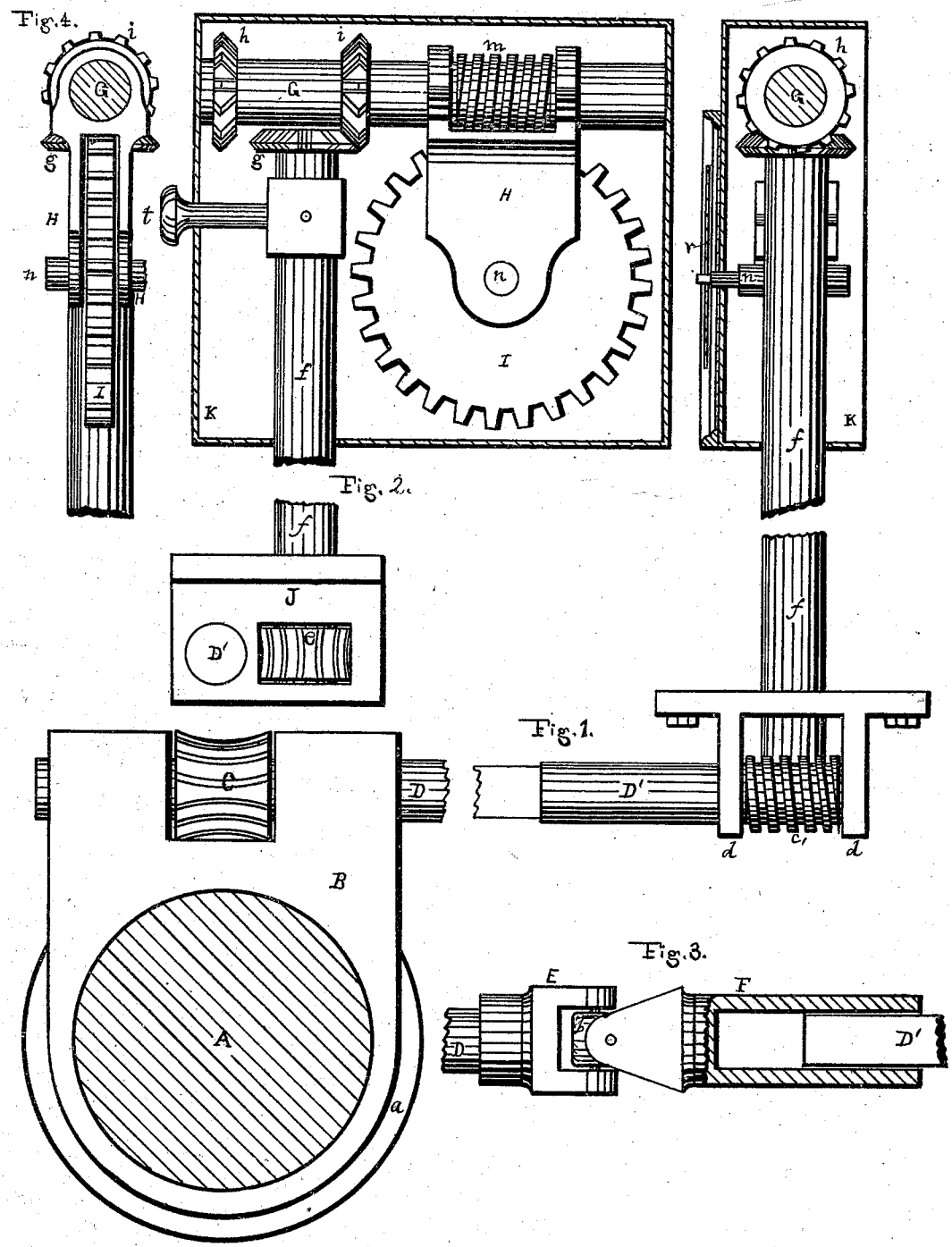

LEWIS V. ADAMS, OF ROCK ISLAND, ILLINOIS.

IMPROVEMENT IN STATION-INDICATORS.

Specification forming part of Letters Patent No. 150,455, dated May 5, 1874; application filed January 28, 1874.

*To all whom it may concern:*

Be it known that I, LEWIS V. ADAMS, of Rock Island, in the county of Rock Island and State of Illinois, have invented new and useful Improvements in Station-Indicators, of which the following is a full description, reference being had to the accompanying drawings, in which—

Figure 1 is a side elevation; Fig. 2, an end view; and Figs. 3 and 4, details.

The object of my invention is to construct an indicator, operated by the car as it moves, which will accurately indicate the position of the car at all times The device is operated by the car-axle, and inside of the car is placed a dial, upon which the names or numbers of the streets are marked.

In the drawing I have not represented any portion of the car except the axle.

In the drawing, A represents one of the axles of a car, upon which is placed a screw-thread, *a*. B is a collar, in which the axle A revolves. In the upper part of this collar is a recess to receive the gear-wheel C, which is placed upon the shaft D D', the part D having its bearings in B, and the part D' having bearings *d d*. The two parts of the shaft D D' are connected together by a universal joint, (represented in Fig. 3,) consisting of the parts E F. The part E may be permanently connected to D, but the part F is hollow and D' is square, so that there is a compensation for any spring of the car, or any irregularity of movement. *c'* is a screw-thread upon the shaft D', which engages with a cog-wheel, *e*, which is secured upon the end of the shaft *f*. This wheel *e* may be located in a box or casing, J, and it, with the bearings *d d*, is secured to the bottom of the car in any suitable manner. On the upper end of the shaft *f* is a beveled gear-wheel, *g*, arranged so as to engage with one or the other of the beveled gear-wheels *h i*, which are placed upon shaft G, which has its bearings in the box or case K, which box may be located at any convenient place in the car. *m* is a screw-thread upon the shaft G. H is a hanger, through the upper ends of which the shaft G revolves, and in the lower ends of which the wheel I is pivoted by means of a shaft, *n*, to which the wheel I is secured, one end of which shaft projects through the casing K, and has a pointer, *r*. To the shaft *f* is connected a button, *t*, which is outside of the casing K, and by the use of which the position of the shaft can be changed, so that the wheel *g* will be in gear either with *h* or *i*, as may be desired. Any suitable device may be used for holding the shaft *f* in desired position, such as a latch, and notches upon the rod *s*.

As shown, the device is calculated for a car which is to run four miles.

The axle, as represented, is two and one-half inches in diameter. The wheel *c* is one inch in diameter, and has nine cogs. The wheel *e* is one inch in diameter, and has twelve cogs. The wheel I is two and a half inches in diameter, and has twenty-eight cogs. The car-wheel is supposed to be twenty-eight inches in diameter.

The size of the parts, of course, can be varied, as may be necessary.

When the device has been properly attached to a car, it is to be run over its route. When the car reaches the first street which it crosses, the position of the pointer upon the dial must be indicated, and so on over the whole route. The names or numbers of the streets can then be permanently marked upon the dial in their proper places.

The wheels *g h i* are designed to be used upon that class of cars which are turned around at each end of the route, so that in going over the route in one direction the pointer will move from left to right, and by changing the position of the wheel *g*, when the car returns, the pointer will move in the opposite direction.

In that class of cars which are not turned around at each end of the route, and in which the horses are changed from one end of the car to the other, a screw-thread may be placed upon the shaft *f*, arranged to gear with the wheel I.

The dial mentioned is to be placed upon the face of the case K, so as to be in view of passengers.

D' is loosely inserted into F. The parts E F may be regarded as parts of the shaft designated by the letters D D'.

What I claim as new is—

The axle A, having thread $a$, and shafts D D', having worm-wheel $c$ and screw $c'$, and connected by a universal joint, E F $b$, in combination with shafts $f$ and G and wheel I, substantially as and for the purpose herein specified.

LEWIS V. ADAMS.

Witnesses:
L. L. BOND,
O. W. BOND.